United States Patent
Lee et al.

(10) Patent No.: US 8,582,816 B2
(45) Date of Patent: Nov. 12, 2013

(54) METHOD AND APPARATUS FOR VIDEO ANALYTICS BASED OBJECT COUNTING

(75) Inventors: Kual-Zheng Lee, Chiayi (TW); Luo-Wei Tsai, Kaohsiung (TW); Pang-Chan Hung, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 125 days.

(21) Appl. No.: 13/422,496

(22) Filed: Mar. 16, 2012

(65) Prior Publication Data
US 2013/0148848 A1 Jun. 13, 2013

(30) Foreign Application Priority Data
Dec. 8, 2011 (TW) .............................. 100145363 A

(51) Int. Cl.
*G06K 9/00* (2006.01)
(52) U.S. Cl.
USPC .......................................... 382/103; 382/181
(58) Field of Classification Search
USPC ......................................................... 382/103
See application file for complete search history.

(56) References Cited

U.S. PATENT DOCUMENTS

| | | | |
|---|---|---|---|
| 4,908,704 A * | 3/1990 | Fujioka et al. ................ 348/155 |
| 6,697,104 B1 | 2/2004 | Yakobi et al. | |
| 7,176,441 B2 * | 2/2007 | Sumitomo et al. ............ 250/221 |
| 7,221,779 B2 * | 5/2007 | Kawakami et al. ........... 382/107 |
| 7,409,076 B2 * | 8/2008 | Brown et al. ................. 382/103 |
| 7,466,844 B2 | 12/2008 | Ramaswamy et al. | |
| 7,482,774 B2 * | 1/2009 | Gregori ......................... 318/466 |
| 7,787,656 B2 | 8/2010 | Chen | |
| 8,175,334 B2 * | 5/2012 | Takahashi ..................... 382/103 |
| 2003/0066875 A1 * | 4/2003 | Rouet ........................... 235/375 |
| 2006/0227862 A1 | 10/2006 | Campbell et al. | |
| 2009/0010490 A1 | 1/2009 | Wang et al. | |
| 2009/0180583 A1 | 7/2009 | Park et al. | |
| 2010/0124357 A1 | 5/2010 | Hampapur et al. | |
| 2010/0232644 A1 | 9/2010 | Hsiao et al. | |
| 2011/0037852 A1 | 2/2011 | Ebling et al. | |

OTHER PUBLICATIONS

D. Roqueiro and V. A. Petrushin, "Counting people using video cameras," International Journal of Parallel, Emergent and Distributed Systems, vol. 22, pp. 193-209, 2007.
B. Antic', D. Letic', D. C'ulibrk, and V. Crnojevic, "K-means based segmentation for real-time zenithal people counting," in Proc. IEEE Conference on Image Processing, 2009, pp. 2565-2568.
S. Yu, X. Chen, W. Sun, and D. Xie, "A robust mehtod for detecting and counting people," in Proc. IEEE International Conference on Audio, Language, and Image Processing, 2008, pp. 1545-1549.
H. C. Fu, J.-R. Chen, and H. T. Pao, "Remote head counting and tracking in crowed scene via WWW/INTERNET," in Proc. IADIS International Conference on WWW/INTERNET, 2007, pp. 213-216.

(Continued)

*Primary Examiner* — Tom Y Lu
(74) *Attorney, Agent, or Firm* — Rabin & Berdo, P.C.

(57) ABSTRACT

A video analytics based object counting method which can obtain and process video frames from one or more video sources is proposed. By setting a variety of parameters, calculating a reference point, and a mapping table, a sampled referenced image can be constructed to obtain image pixels variation information according to these parameters. With the changed value of multiple sampling line segments and the pre-defined reference object, total object counts can be estimated by analyzing the whole number of the triggered sampling line segments and their directional states.

18 Claims, 15 Drawing Sheets

(56) References Cited

OTHER PUBLICATIONS

J.-W. Kim, K.-S. Choi, B.-D. Choi, and S.-J. Ko, "Real-time vision-based people counting system for the security door," in Proc. International Technical Conference on Circuits/Systems Computers and Communications, 2002, pp. 1-4.

S. Harasse, L. Bonnaud, and M. Desvignes, "People counting in transport vehicles," Proceedings of World Academy of Science, Engineering and Technology, vol. 4, pp. 221-224, 2005.

F. L. C. Pádua, M. F. M. Campos, and R. L. Carceroni, "Real-time pedestrian counting based on computer vision," in Proc. Brazilian Symposium on Intelligent Automation, 2003, pp. 1-6.

D. B. Yang, H. H. G. Banos, and L. J. Guibas, "Counting people in crowds with a real-time network of simple image sensors," in Proc. IEEE International Conference on Computer Vision, 2003, pp. 122-129.

K. Terada, D. Yoshida, S. Oe, and J. Yamaguchi, "A method of counting the passing people by using the stereo images," in Proc. International Conference on Image Processing, 1999, pp. 338-342.

L. A. Wang, W. M. Hu, and T. N. Tan, "Recent developments in human motion analysis," Pattern Recognition, vol. 36, pp. 585-601, Mar. 2003.

R. Hartley and A. Zisserman, Multiple View Geometry in Computer Vision (2nd Ed.). Cambridge: Cambridge University Press, 2004. ,Chapter 2, section 2.3 "Projective transformations", pp. 32-36.

\* cited by examiner

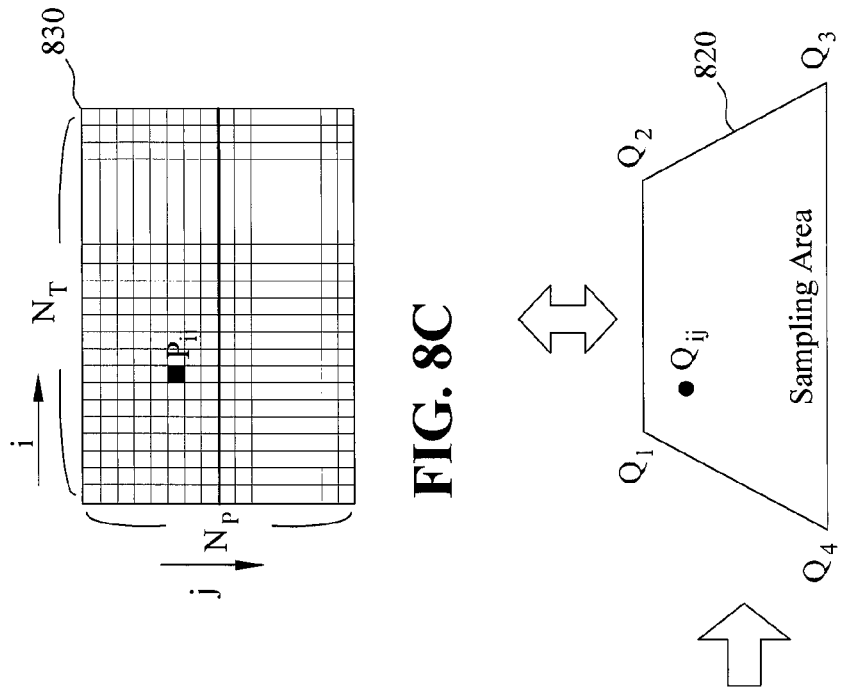
FIG. 8C
FIG. 8B
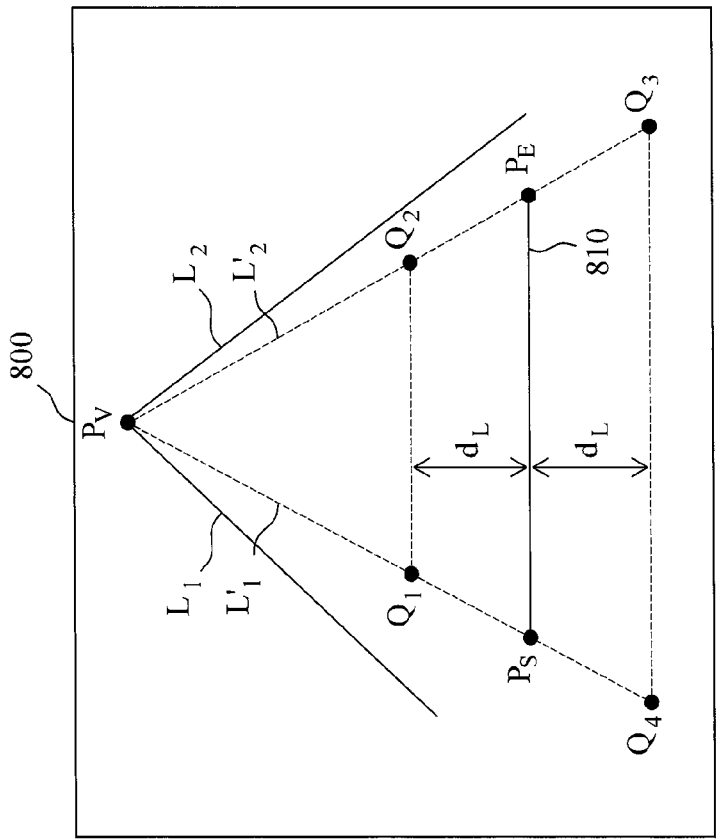
FIG. 8A

| S | S | T | T | T | T | T | T | T | T | T | T | T | B | B | B | S | B | B | B | B | B | S

FIG. 14

| S | S | T | T | T | T | T | T | T | T | T | T | T | B | B | B | S | B | B | B | B | B | S

FIG. 16

METHOD AND APPARATUS FOR VIDEO ANALYTICS BASED OBJECT COUNTING

CROSS-REFERENCE TO RELATED APPLICATION

The present application is based on, and claims priority from, Taiwan Application No. 100145363, filed Dec. 8, 2011, the disclosure of which is hereby incorporated by reference herein in its entirety.

TECHNICAL FIELD

The present disclosure generally relates to a method and apparatus for video analytics based object counting.

BACKGROUND

Object counting is calculating number of objects in and out of an area or crossing a counting line through specific devices. The wide range of its applications includes, such as in environments of buildings, roads, shopping mall, or public transportation systems. It may timely master number of people or vehicles in specific areas through object counting, for number controlling people in and out of buildings, road traffic control or measuring public facilities utilization, etc. Common methods of object counting are such as by gate counters, infrared sensors, and video analysis.

Gate counter technology is to drive a counter by pushing rotating railings when an object through a gate. This technology may accurately count objects passing through the gate. However when an object passes through a gate, the object speed requires be reduced. Infrared sensor technology sets up an infrared sensor in the lateral side of an entrance or an exit, and uses the characteristic of infrared-breaking to estimate the number of objects when an object passes through the entrance or the exit. When objects are in and out side by side, the shading among the objects may induce an object counting error. Video analysis technology uses video cameras to shot a counting area, and uses an object detection and object tracking method to label the coordinates of an object to determine if its trajectory is in and out of an area or across a counting line. When detecting an object, object counting may be easily affected by the light source, and when tracking multiple objects, situations of object occlusion, object merge, or object isolation, etc. may also easily induce misjudge.

Video analytics based techniques usually mount photography-related devices on the top of a scene and look down for taking pictures, and then use a variety of different image recognition and processing technologies to achieve object counting. The area estimation method detects variation pixels over a video frame and labels out the area where the object locates at, then combines with object tracking to know the timing that an object triggers a cross-line event, and estimates the number of objects with an analysis of statistics of the occupied area of the objects. For example, one relevant technique tracks an object over a video frame. And, when an object enters into a counting area, the passing objects are counted by combining with the area of the object's motion pixels projected on an image in both X and Y directions.

Another technique of a related literature as shown in FIG. 1, utilizes image preprocessing and feature extraction to cut a to-be-tested image 110 into an image with a plurality of grids 120, and supplemented with a variety of machine learning methods to analyze the number of objects and the relationship among the grids. When an object crosses a base line, this technique determines if there is any object in the image 120 according to the information of the grids' variation, as shown in label 130, and estimates the count of objects. A technique of another related literature uses an algorithm to cut an object into multiple regions with approximate areas to estimate the number of objects when the object crosses a base line.

Another technique using a template matching method defines an object template, and uses a template matching scheme to superpose the area where the object locates at. It also tracks the moving trajectory of the object to determine its direction and whether a cross-line event has occurred, thereby achieving the object counting. Another technique uses image edge information to establish a local pedestrian template. And, when a pedestrian enters a scene, this technique uses a similarity matching scheme to verify if there is a pedestrian and counts the pedestrians. Another related technique performs object detection and tracking by using head shapes such as round or oval, and color information. Some of techniques approximate a foreground area in an object frame with a polygonal template. Some of techniques approximate an object block in an object frame with a convex polygon template.

In order to avoid the accuracy of the object counting being affected by the appearance of changed area of the object, some related techniques use a pre-trained object detection classifier to detect the portion containing a specific object in the images, such as capturing a skin region, a head region, or a facial region. These techniques also combine with object tracking and similarity matching to determine if there is any triggered cross-line event, and count the objects.

A technique using an optical flow method performs a large number of operations to calculate motion vectors of two images with the characterization generated by the object moving, and counts the objects with the speed and direction information contained in the motion vectors. For example, a related technique determines the number of pedestrians according to peaks of the light flow. For the positions indicated by arrows 210, 220, 230 shown in FIG. 2, there are three peaks of the light flow, and determine that three pedestrians passed through.

In order to effectively avoid the occlusion issue among the pedestrians, some related techniques use multiple cameras with different angles to take pictures. These techniques also calculate the corresponding relationship among the pedestrians by using the geometric relationship of the cameras, and then estimate the direction and count the number of pedestrians crossing a base line. Some related techniques use dual cameras to obtain image depth information to determine the number of persons crossing a base line. Some commercial products use thermal images as resources of taking pictures, to improve the accuracy for object detection and tracking.

In the application technologies of object counting, it is very worthy of study and development that object counting may be performed normally in a scenario with many objects standing side by side or oppositely crossing a base line, and with a high accuracy without using a specific object template, without confirmed detection of independent objects in the image frame, and without complicated procedures for object labeling and tracking,

SUMMARY

The exemplary embodiments of the present disclosure may provide a method and apparatus for video analytics based object counting.

One exemplary embodiment relates to a method for video analytics based object counting. The method comprises: obtaining one or more video frames from at least one video source, and setting at least one parameter, calculating a reference point, and calculating a sampling look up table (LUT) by referring to the one or more video frames; on each of the one or more video frames, retrieving a sampling image to obtain information of one or more variation pixels in the sampling image according to the at least one parameter, the reference point, and the sampling LUT, and calculating the statistics of variation counts on a plurality of sampling line segments to determine at least one object state on the plurality of sampling line segments; and performing object counting of at least one moving object to obtain an object count according to information of the at least one parameter and the at least one object state on the plurality of sampling line segments.

Another exemplary embodiment relates to an apparatus for video analytics based object counting. The apparatus comprises an object counting module and a computer readable medium. The object counting module performs under control of one or more computer systems: obtaining one or more video frames from at least one video source, and setting at least one parameter, calculating a reference point, and calculating a sampling look up table (LUT) by referring to the one or more video frames; on each of the one or more video frames, retrieving a sampling image to obtain information of one or more variation pixels in the sampling image according to the at least one parameter, the reference point, and the sampling LUT, and calculating the statistics of variation counts on a plurality of sampling line segments to determine at least one object state on the plurality of sampling line segments; and performing object counting of at least one moving object to obtain an object count according to information of the at least one parameter and the at least one object state on the plurality of sampling line segments. The computer readable medium is for storing results of the calculating.

The foregoing and other features of the disclosure will become better understood from a careful reading of a detailed description provided herein below with appropriate reference to the accompanying drawings.

BRIEF DESCRIPTION OF THE DRAWINGS

FIG. 8A, FIG. 8B, and FIG. 8C show schematic views of the sampling point calculation, according to an exemplary embodiment.

FIG. 12A and FIG. 12B shows a schematic view of labeling the SLS satisfying the threshold criterion with an accumulated threshold of variation pixel and a differential value threshold, according to an exemplary embodiment.

FIG. 14 shows an exemplary result of object states on sampling line segments after performing the repair procedure with the calculated $D_i(t)$ in FIG. 12b, according to an exemplary embodiment.

FIG. 16 shows an exemplary result of object states on sampling line segments after performing the repair procedure for the sampling line segments with a STATIC state in FIG. 15, according to an exemplary embodiment.

DETAILED DESCRIPTION OF DISCLOSED EMBODIMENTS

In the exemplary embodiments of the disclosed technology for video analytics based object counting, the technology performs statistical analysis on sample data for the adjacent area of a virtual counting line, and defines multiple sampling line segments on the virtual counting line in parallel to the moving direction of an object, and concludes statistics of variation state on the sampling line segments to perform the object counting. The object counting in a video frame may include object counting setting and real-time object counting, according to the disclosed embodiments. The object counting setting may be performed under an offline condition, while the real-time object counting may be performed under an online condition.

Figure 1:
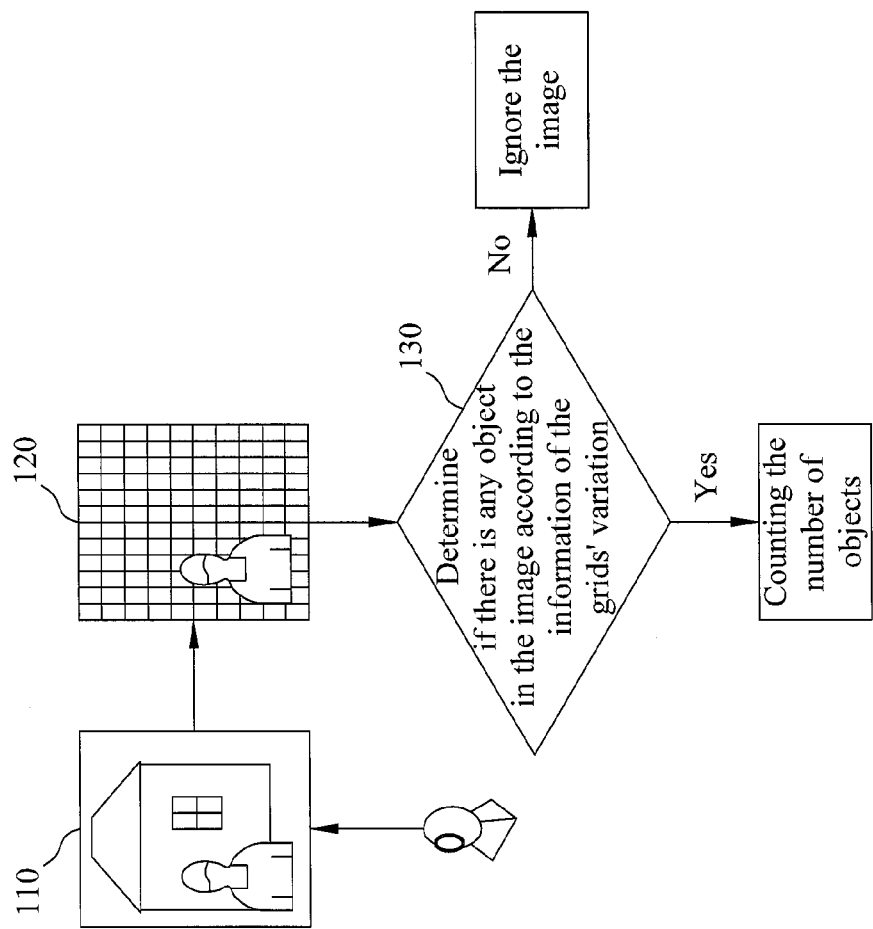
FIG. 1 shows a schematic view of a technique for estimating the count of objects by using an area estimation scheme.
Figure 2:
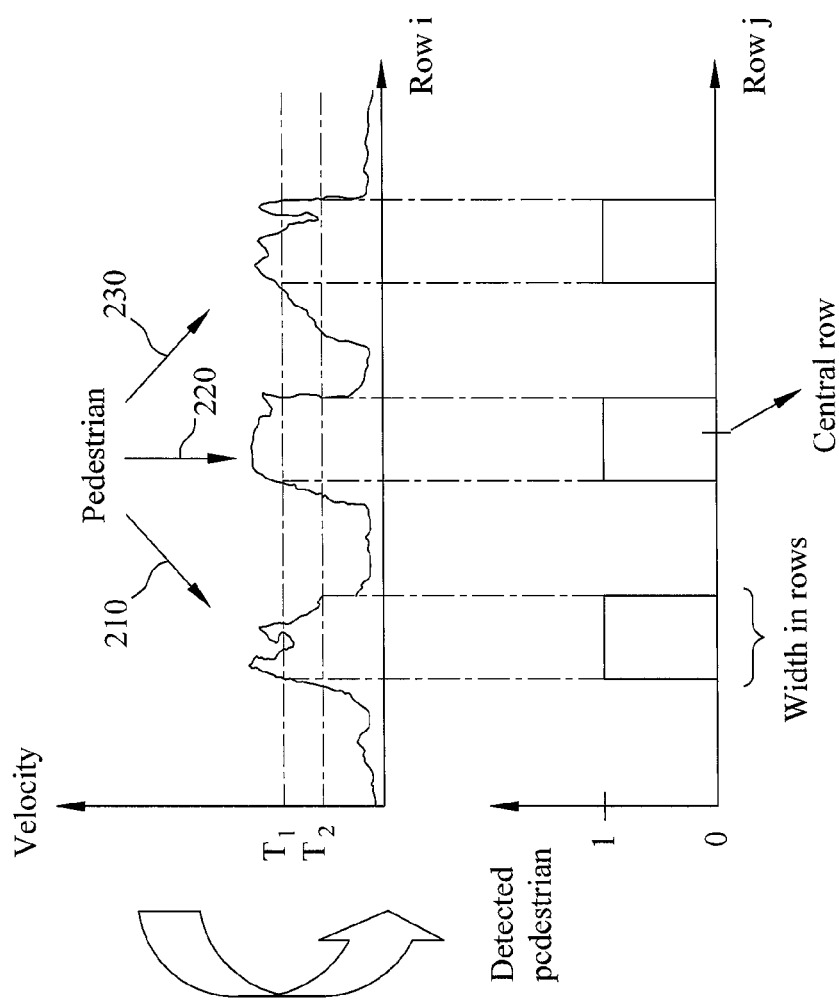
FIG. 2 shows a schematic view of a technique for estimating the count of objects by using an optical flow scheme.
Figure 3A:
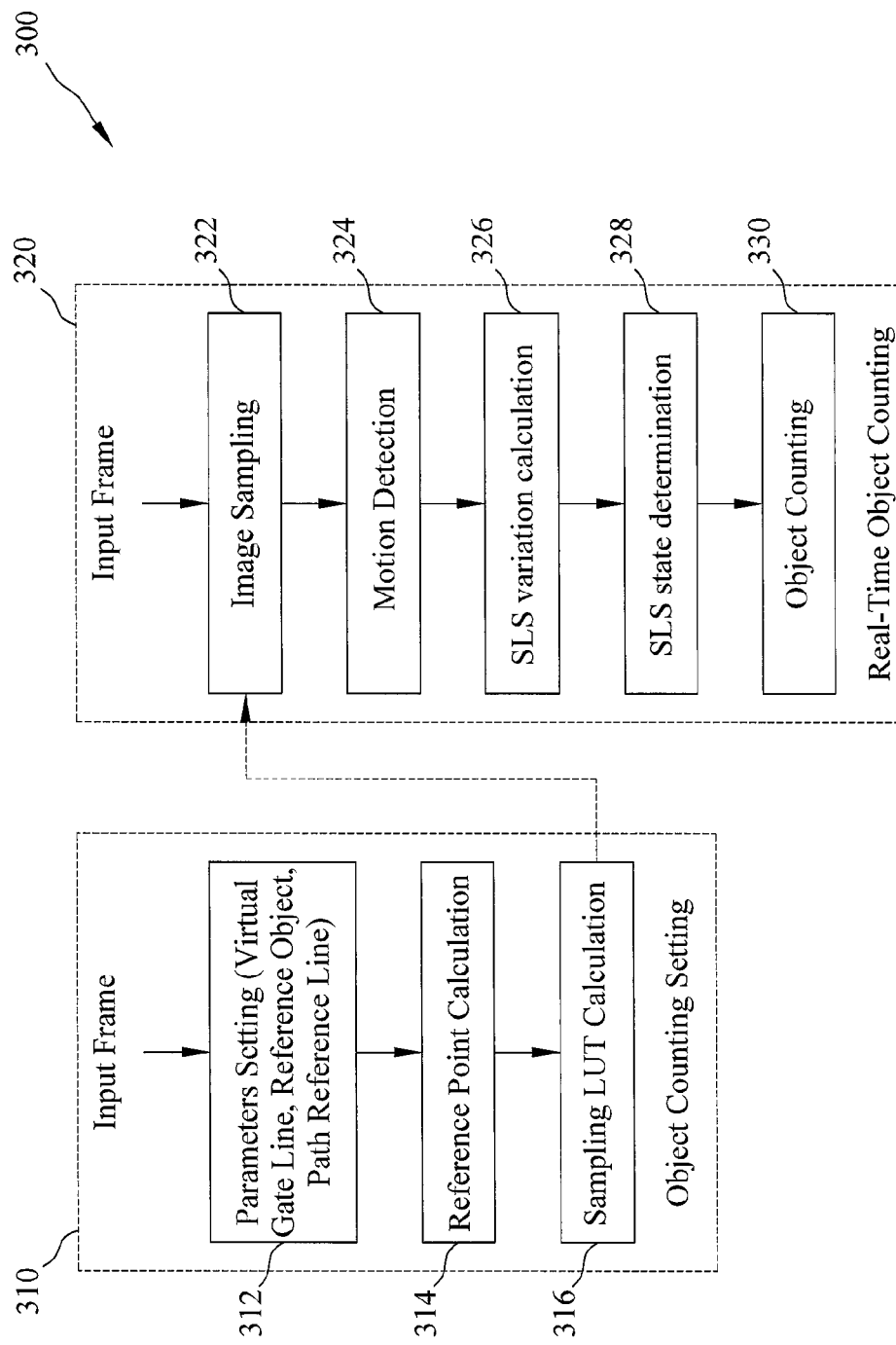
FIG. 3A shows a schematic view of a method for video analytic based object counting, according to an exemplary embodiment.

FIG. 3A shows a schematic view of a method for video analytic based object counting, according to an exemplary embodiment. Referring to FIG. 3, object counting method 300 receives video source from such as video devices, video files, or network streams to obtain one or more frames. The method 300 may be divided into object counting setting 310 and real-time object counting 320. The object counting setting 310 performs parameter setting 312, reference point calculation 314, and sampling look up table (LUT) calculation 316 for each of one or more input frames. The real time object counting 320 performs image sampling 322, motion detection 324, SLS variation calculation 326, SLS state determination 328, and object counting 330 for each input frame.

In the image sampling 322, it constructs a sampling image from the input frame according to at least one constructed sampling LUT table. In the motion detection 324, it detects variation state for each pixel in the sampling image. In the SLS variation calculation 326, it calculates the statistics of variation count for each of multiple sampling line segments. In the SLS state determination 328, it determines a corresponding state category for an object on each SLS in sampling image, to verify if it is possible that the input frame contains the object. In object counting 330, it estimates the number of objects crossing a virtual gate line with the variation of determined corresponding state category on each SLS.

Figure 5:
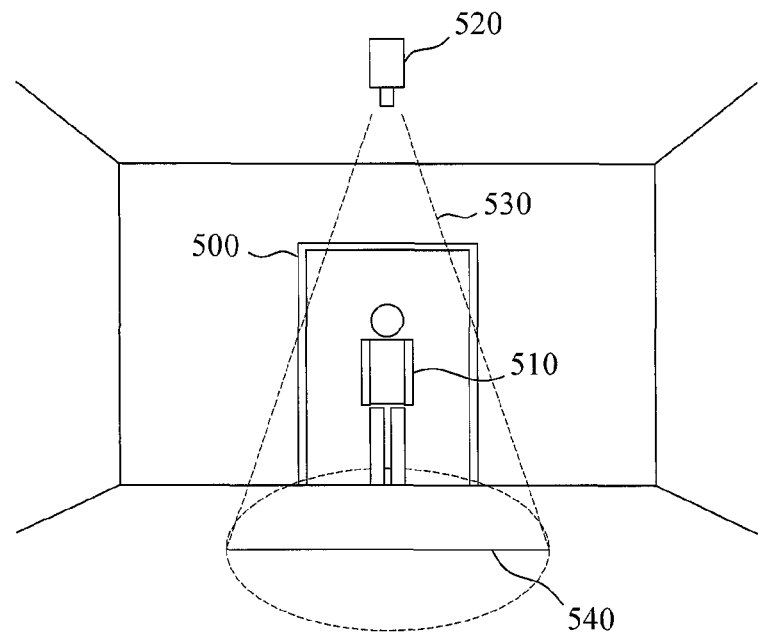
FIG. 5 shows a schematic view illustrating an indoor application scenario of object counting, according to an exemplary embodiment.
Figure 6:
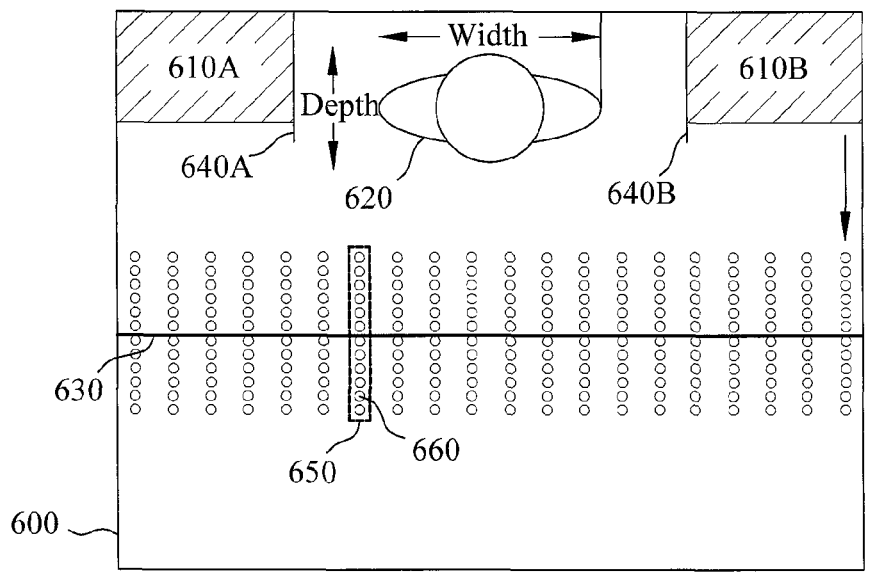
FIG. 6 shows a top-view counting frame and an illustration of parameter setting on the frame, according to an exemplary embodiment.

The virtual gate line has a starting point and an end point of a straight line in the input frame, which is used for counting. In the to-be-processed frame, a region with a size approximate to a moving object may be taken as a reference object. The information for the reference object may include information such as an object width and an object depth. In one scene, the object width may be defined as the length of an object parallel to a virtual gate line (the unit is by pixel), and the object depth may be defined as the length of the object vertical to the virtual gate line (the unit is also by pixel); a path reference line is used to determine a straight line with a direction of a moving object, and the path reference line may be defined as the straight line parallel to the direction of the moving object in the scene. The following FIG. 5 and FIG. 6 give two exemplary application scenes to illustrate the reference object and the aforementioned definitions.

Figure 3B:
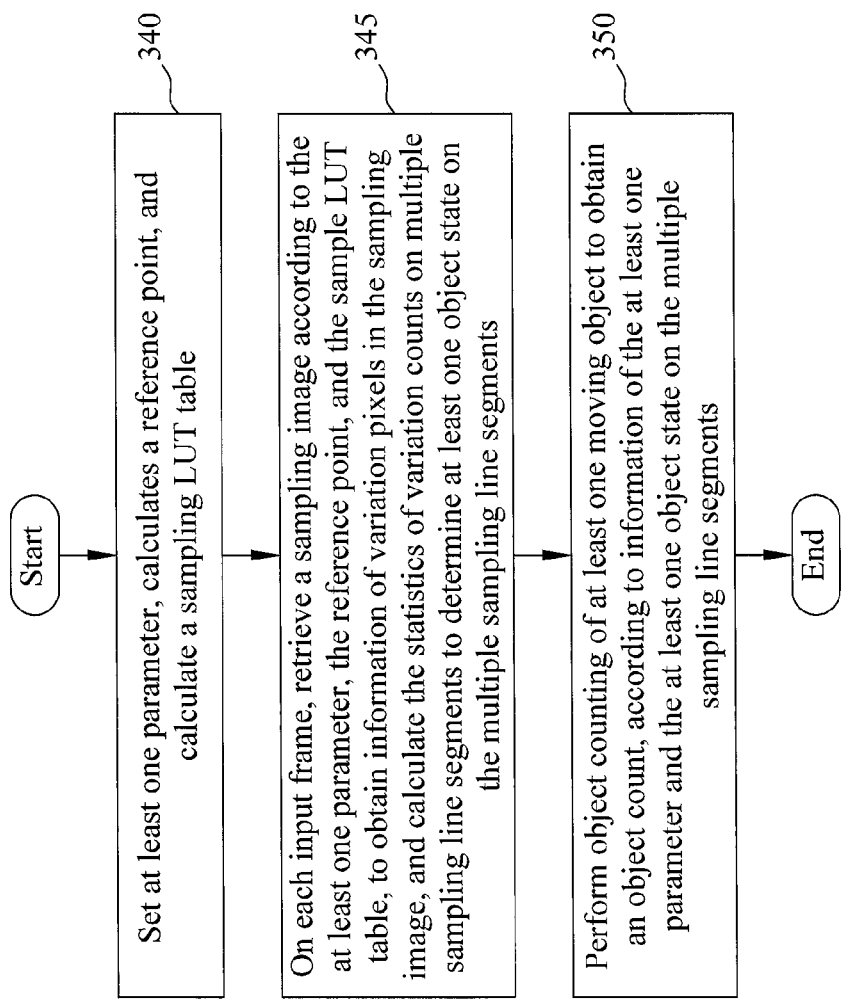
FIG. 3B shows the operation of the method for video analytic based object counting in FIG. 3A, according to an exemplary embodiment.

Accordingly, FIG. 3B shows the operation of the method for video analytic based object counting in FIG. 3A, according to an exemplary embodiment. As shown in FIG. 3B, by referring to a plurality of input frames, the method sets at least one parameter, calculates a reference point, and calculates a sampling LUT table (step 340). On each input frame, the method also retrieves a sampling image according to the at least one parameter, the reference point, and the sample LUT table, to obtain information of variation pixels in the sampling image, and calculates the statistics of variation counts on multiple sampling line segments to determine at least one object state on the multiple sampling line segments (step 345). And, the method further performs object counting of at least one moving object to obtain an object count, according to information of the at least one parameter and the at least one object state on the multiple sampling line segments (step 350).

Figure 4:
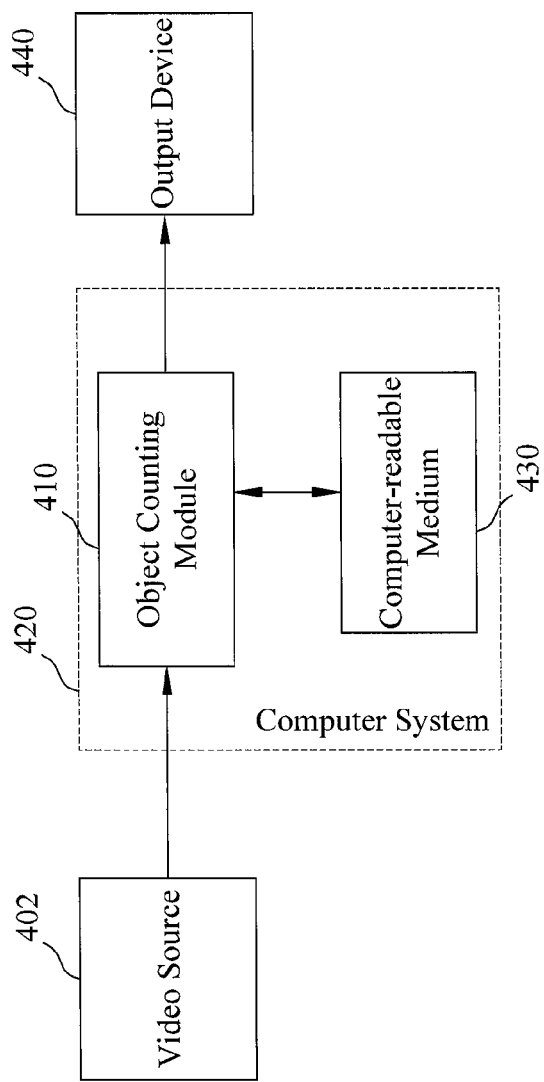
FIG. 4 shows an apparatus for video analytic based object counting, according to an exemplary embodiment.

Combined with this object counting method, FIG. 4 shows an apparatus for video analytic based object counting, according to an exemplary embodiment. Referring to FIG. 4, the object counting apparatus may comprise an object counting module 410, and a computer-readable medium 430. The object counting module 410 receives video source 402 to obtain frame information. The object counting module 410 counts the objects across a virtual gate line, on a computing platform such as under the control of one or more computer systems 420, according to the operation of the object counting method in FIG. 3B. The one or more computer systems 420 may store the computation results generated by the object counting module 410 to the computer-readable medium 430 or output to an output device 440 such as an external monitor. The video source 402, for example, comes from video or image input of at least one capture device, at least one audio or video file, or network streaming, etc. The object counting module 410 may be, for example, an executable program instruction set in one or more computer system. The object counting module 410 may, for example, execute in one or more physical central processing units of the one or more computer system 420.

Accordingly, two exemplary application scenarios illustrate the object counting setting 310. FIG. 5 shows a schematic view illustrating an indoor application scenario of object counting, according to an exemplary embodiment. The indoor application scenario in FIG. 5 contains a virtual gate line 540 and a staff 510. A video camera device 520 is set up at top of an indoor room, and takes a top view of the ground within a field of view 530. A captured image frame by the video camera device 520 may be shown as in FIG. 6. FIG. 6 shows a top-view counting frame and an illustration of parameter setting on the frame, according to an exemplary embodiment. In FIG. 6, a top-view counting frame 600 may comprise door walls 610A and 610B, and a staff 620. To count the staffs in and out of the door 500, a virtual gate line 630 may be labeled on the counting frame 600 to count the staffs across the virtual gate line. The virtual gate line 630 corresponds to a virtual gate line 540 on the ground of the practical application scenario shown in FIG. 5.

In the counting frame 600, a region with a size approximate to a moving object may be taken as a reference object, such as staff 620 is taken as the reference object. The object width and the object depth of the reference object are shown in FIG. 6. And, in the counting frame 600, two path reference lines 640A and 640B parallel to the moving direction of the staff 620 are labeled. These two path reference lines are used to determine a moving direction of the object, for example, path reference lines 640A and 640B are constructed by the sides of door walls. A path reference line may be expressed as a starting-point coordinate and an end-point coordinate, or may be expressed as a point coordinate associated with a slope. To gather statistics of moving state of objects, it may define several sampling line segments parallel to an object moving direction on virtual gate line 630 in the scene. A SLS 650 is formed by a number of sampling points 660, and a sampling image is formed by the sampling points of all sampling line segments.

Figure 7:
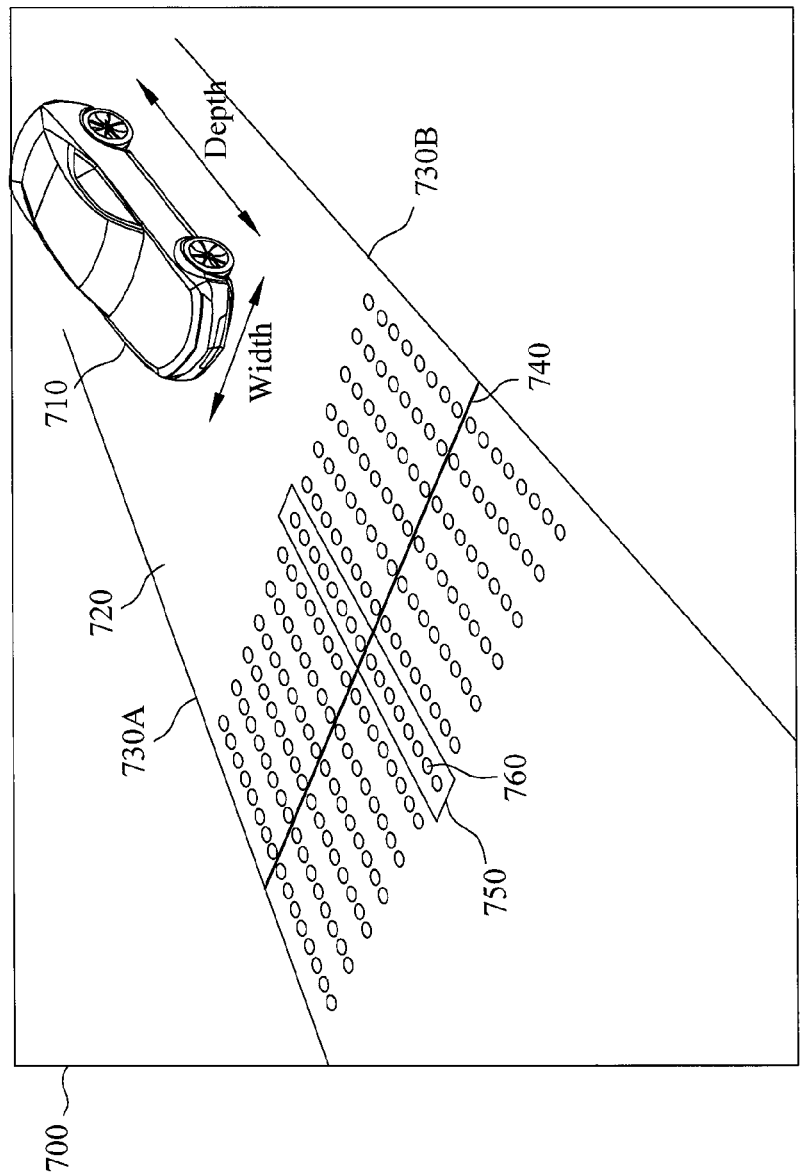
FIG. 7 shows a side-view counting frame and an illustration of parameter setting on the frame, according to an exemplary embodiment.

Take another outdoor scene frame 700 as an example, FIG. 7 shows a side-view counting frame and an illustration of parameter setting on the frame, according to an exemplary embodiment. There is a vehicle 710 at a driving lane 720 in the frame 700, the vehicle 710 may be regarded as a reference object having an object width and an object depth, two parallel path reference lines 730A and 730B may be labeled on the driving lane 720, and a virtual gate line 740 is defined for counting the objects. In the scene frame 700, several sampling line segments 750 parallel to an object moving direction may be defined on the virtual gate line 740. Each of these sampling line segments is formed by a number of sampling points 760, and sampling points of all sampling line segments form a sampling image.

In the reference point calculation 314, the reference point is the intersection of the two path reference lines on the frame, also known as the vanishing point, is used as the reference for the sampling point calculation. Assume that two path reference lines are $L_1$ and $L_2$, the starting point coordinate and end point coordinate of $L_1$ are $(x_{11}, y_{11})$ and $(x_{12}, y_{12})$, and the starting point coordinate and the end point coordinate of $L_2$ are $(x_{21}, y_{21})$ and $(x_{22}, y_{22})$, then the coordinate $(x_V, y_V)$ of the reference point $P_V$ may be calculated by the intersection of the two lines, or by a slope and a point coordinate. When the direction of the camera viewing angle perpendicular to the ground plane, then the path reference line is two parallel lines on the frame, that is, the intersection of $L_1$ and $L_2$ is a vanishing point of infinity. This situation may use two maximum values as a reference point coordinate and it is not necessary to calculate the reference point.

According to the sampling LUT calculation 316, the sampling LUT may be constructed by a sampling point set obtained from multiple sampling line segments. For the examples shown in FIG. 6 and FIG. 7, it may select many pixels from both sides of the virtual gate line in the scene frame to form the sampling image, and the width and height of the sampling image are $N_T$ pixels and $N_P$ pixels, respectively. In other words, $N_T$ is the total number of sampling line segments on the virtual gate line, and $N_P$ is the total number of sampling points on a SLS. Pixels of any column in the sampling image are the sampling data of a SLS. FIG. 8A, FIG. 8B, and FIG. 8C show schematic views of the sampling point calculation, according to an exemplary embodiment. In an image frame 800 of FIG. 8A, L1 and L2 are two path reference lines in the frame, the starting point for the virtual gate line 810 is $P_S$ $(x_S, y_S)$, and the end point is $P_E$ $(x_E, y_E)$. $P_V(x_V, y_V)$ is the calculated reference point, and forms two regional reference lines, i.e. $L_1' = \overline{P_V P_S}$ and $L_2' = \overline{P_V P_E}$, respectively.

Assume that a reference object is assigned with width of $l_W$ (pixels) and depth of $l_D$ (pixels), and the number of sampling line segments included in the reference object is defined to be $N_O$, then the distance $d_T$ between any two sampling line segments may be calculated as follows:

$$d_T = \frac{l_w}{N_0 - 1}.$$

Therefore, the total number of sampling line segments on the virtual gate line (i.e., the width of the sampling image $N_T$) may be calculated by the following formula:

$$N_t = \left\lfloor \frac{\sqrt{(x_E - x_s)^2 + (y_E - y_s)^2}}{d_T} \right\rfloor + 1$$

In other words, the width of the sampling image $N_T$ may be calculated from $N_O$, i.e. the number of the sampling line segments included in a reference object.

In the image frame 800 of FIG. 8A, there are two lines parallel to the virtual gate line $\overline{P_S P_E}$ and with a sampling interval $d_L$, and four intersections, i.e. $Q_1$, $Q_2$, $Q_3$ and $Q_4$, of the two parallel lines with two straight lines $L_1'$ and $L_2'$, may be obtained. As shown in FIG. 8B, thus a quadrilateral area covered by these four intersections is the sampling area 820. In order to map a point $P_{ij}$ on the sampling image onto the point $Q_{ij}$ on the sampling area 820, i=1, 2, ..., $N_T$, j=1, 2, ..., $N_P$, a homography conversion scheme may be used for calculating the coordinate of the point $Q_{ij}$.

For example, Assume that the width and the height of the sampling image are $N_T$ and $N_P$, respectively, and the coordinates of four end points of a quadrilateral on the input image are $Q_1$, $Q_2$, $Q_3$, and $Q_4$, then a combination of four pairs of mapping points may be defined, i.e. $Q_1$—(1,1), $Q_2$—($N_T$,1), $Q_3$—($N_T$,$N_P$), $Q_4$—(1,$N_P$). With these four pairs of mapping points and a homography conversion scheme, a 3×3 coordinate transformation matrix may be obtained. As shown in FIG. 8B and FIG. 8C, this transformation matrix may be used to convert between a sampling point $P_{ij}$ in the sampling image 830 and the coordinate a point in the sampling area 820. With the transformation matrix, a sampling LUT may be constructed. This sampling LUT is used to obtain a sampling area across the virtual gate line from the input image, and quickly obtain $N_T \times N_P$ data of the sampling image. Here the sampling interval $d_L$ may utilize the object depth $l_D$ to effectively measure the moving state of the object.

Figures 9, 10:
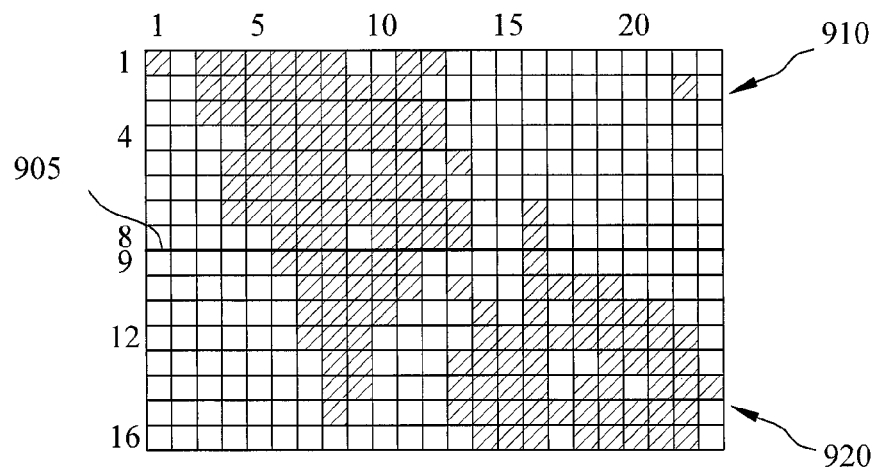
FIG. 9 shows an exemplary motion detection result of a 23×16 sampling image, according to an exemplary embodiment.
FIG. 10 shows a schematic view of calculating $M_i^S$ and $M_i^D$ for each sampling line segment (SLS), with the example of FIG. 9, according to an exemplary embodiment.

Motion detection is used to determine the state of each variation pixel in the $N_T \times N_P$ sampling image. There are many motion detection methods. For example, it may construct a background image without any object, and then compare the difference value for each pixel of an input image and a background image. When the difference value for a pixel is greater than a threshold value, then the pixel is determined as a variation pixel, or called as foreground. In one exemplary embodiment, a background subtraction method based on a Gaussian mixture model is used to detect variation pixels. Other motion detection methods may be utilized too. FIG. 9 shows an exemplary motion detection result of a 23×16 sampling image, according to an exemplary embodiment. In the exemplar, a pixel grid with an oblique line represents a variation pixel. Some of these variation pixels are located in the top area 910 of the virtual gate line 905, and some of these variation pixels are located in the bottom area 920 of the virtual gate line 905.

After having detecting variation pixels of the sampling image, variation of each SLS i may be calculated as follows from these variation pixels, including the accumulated value $M_i^s$ and the differential value $M_i^D$ for the variation pixels in the top area and in the bottom area of the virtual gate line.

$$M_i^s = \sum_{j=1}^{N_P} F_{ij},$$

$$M_i^D = \sum_{j=1}^{\frac{N_P}{2}} (F_{ij} - F_{ik}) \text{ where } k = \frac{N_P}{2} + j.$$

where when $F_{ij}$ is a variation pixel, $F_{ij}=1$, otherwise $F_{ij}=0$. It may be observed from the accumulated value $M_i^s$ that if there is any moving contained in the SLS i. It may also be observed from the differential value for the variation pixels in the top and bottom areas of the virtual gate line $M_i^D$ that the object locates at the top area or the bottom area of the virtual gate line. FIG. 10 shows a schematic view of calculating $M_i^s$ and $M_i^D$ for each SLS i, 1≤i≤23 with the example of FIG. 9, according to an exemplary embodiment. For example, when i=9, there are total 11 variation pixels on this SLS, so $M_i^s$=11. On this SLS, there are, respectively, 5 variation pixels and 6 variation pixels located in the top side and the bottom side of the gate, so $M_i^D$=5−6=−1.

The SLS state determination 328 is used to analyze the state of the object on each SLS. The disclosed exemplary embodiments divide the states of the SLS into four categories, which are static (STATIC), object in the top area of the virtual gate line (TOP), object in the bottom area of the virtual gate line (BOTTOM), and uncertain (UNCERTAIN). And, $M_i^s$ and $M_i^D$ are compared with two predetermined values (i.e., accumulated threshold of variation pixels $T_{motion}$ and differential threshold $T_{diff}$) to determine the object state $D_i(t)$ of SLS i at time t. According to one disclosed exemplary embodiment, FIG. 11 illustrates the object state determination procedure.

Figure 11:
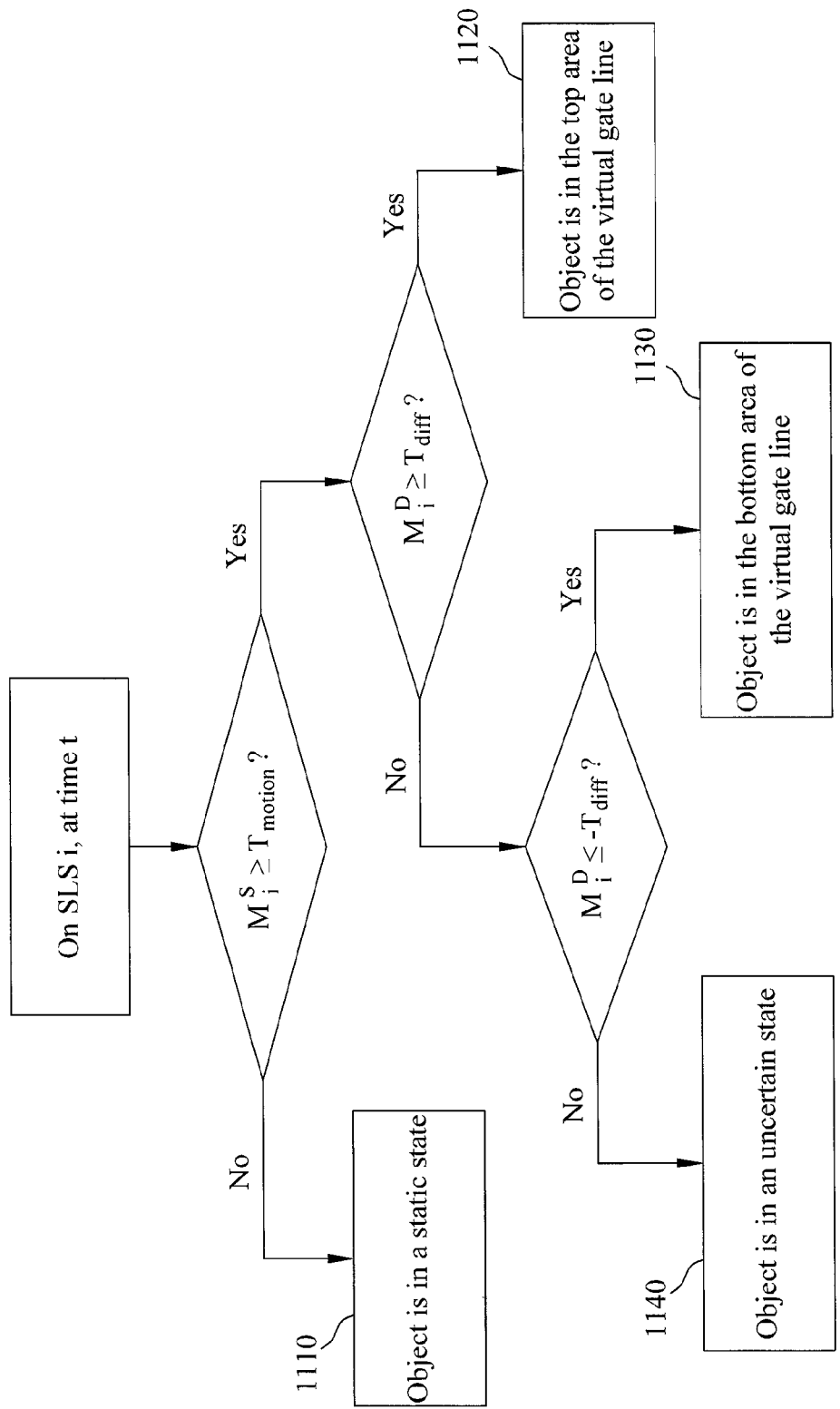
FIG. 11 shows a flowchart of an object state determination procedure for SLS i at time t, according to an exemplary embodiment.

From the object state determination procedure of FIG. 11, it may be seen that the determination conditions of object state on SLS i at time t are shown as following. when $M_i^s$ is less than $T_{motion}$, $D_i(t)$=STATIC, the object is in a static state (step 1110); when $M_i^s$ is greater than or equal to $T_{motion}$ and $M_i^D$ is greater than or equal to $T_{diff}$, $D_i(t)$=TOP, that is, the object is in the top area of the virtual gate line (step 1120); when $M_i^s$ is greater than or equal to $T_{motion}$ and $M_i^D$ is less than $-T_{diff}$, $D_i(t)$=BOTTOM, that is, the object is in the bottom area of the virtual gate line (step 1130); when $M_i^s$ is greater than or equal to $T_{motion}$ and $M_i^D$ is greater than $-T_{diff}$ and less than $T_{diff}$, $D_i(t)$=UNCERTAIN, that is, the object is in an uncertain state (step 1140).

Takes calculated $M_i^s$ and $M_i^D$ in FIG. 10 as an exemplar to carry out this object state determination procedure. It may first observe the SLS with large enough accumulated value $M_i^s$ (i.e., $M_i^s \geq T_{motion}$), and the SLS with the differential value for the variation pixels in the top area and in the bottom area of the virtual gate line $M_i^D$ is larger than or equal to a threshold value or less than the negative of the threshold value (ie, $M_i^D \geq T_{diff}$ or $M_i^D \leq -T_{diff}$). Takes $T_{motion}$=4, $T_{diff}$=2 as an example. It may label these lines from the calculated $M_i^s$ and $M_i^D$ in FIG. 10, $1 \leq i \leq 23$, as shown in FIG. 12A. In FIG. 12A, $M_i^s$ of sampling line segments 4 to 16 and sampling line segments 18 to 22 with double wireframe representation are all greater than or equal to 4; $M_i^D$ of sampling line segments 3 to 7 and sampling line segments 10 to 12 with double wireframe representation are all greater than or equal to 2; and $M_i^D$ of sampling line segments 14 to 22 with dotted wireframe representation are all less than or equal to $-2$.

Then according to the object state determination procedure in FIG. 11, FIG. 12B shows the following. For the SLS i that meets $M_i^s$<4, its $D_i(t)$ equals to STATIC, and is represented by S; For the SLS i that meets $M_i^s \geq 4$ and $M_i^D \geq 2$, its $D_i(t)$ equals to TOP, and is represented by T; For the SLS i that meets $M_i^s \geq 4$ and $M_i^D \leq -2$, its $D_i(t)$ equals to BOTTOM, and is represented by B; For the SLS i that meets $M_i^s$>4 and $M_i^D$>$-2$, its $D_i(t)$ equals to UNCERTAIN, and is represented by U.

Figure 13:
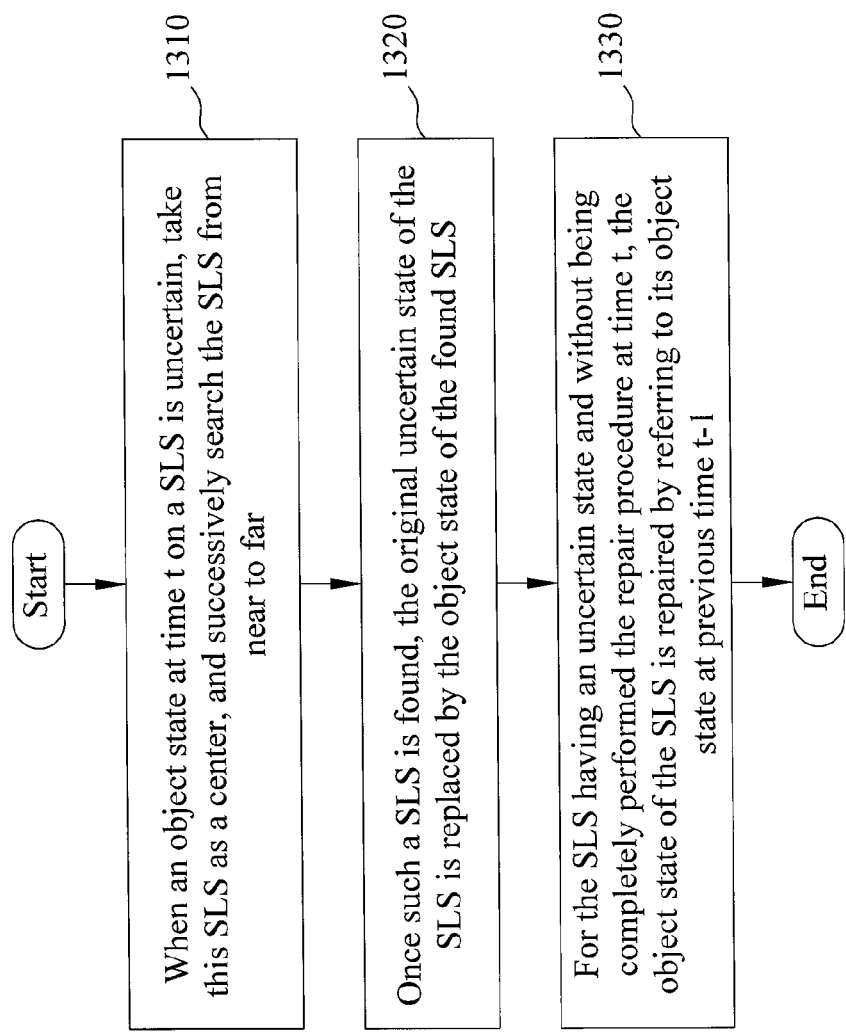
FIG. 13 shows a flow chart of a repair procedure for the SLS having an UNCERTAIN state, according to an exemplary embodiment.

At the moment of an object crossing the virtual gate line, since both sides of the virtual gate line may contain a large number of variation pixels, many sampling line segments are easily to be decided with an uncertain state (UNCERTAIN). Therefore, it is necessary to have a repair process for such sampling line segments with an uncertain state. FIG. 13 shows a flow chart illustrating a repair process for the sampling line segments with an uncertain state, according to an exemplary embodiment. Referring to FIG. 13, when an object state at time t on a SLS is uncertain, it may take this SLS as a center, and successively search the SLS from near to far, as shown in step 1310. Once such a SLS is found, the original uncertain state of the SLS is replaced by the object state of the found SLS, as shown in step 1320. For the SLS having an uncertain state and without being completely performed the repair procedure at time t, the object state of the SLS may be repaired by referring to its object state at previous time $t-1$, as shown in step 1330.

According to the repair procedure of FIG. 13, the calculated $D_i(t)$ in FIG. 12B may be used to repair the object states for the SLS i, $1 \leq i \leq 23$. The object states after the repair procedure are shown in FIG. 14. In FIG. 14, as indicated by arrows, object states of sampling line segments 8 and 9, and SLS 13 have been replaced by T from U.

Figure 15:
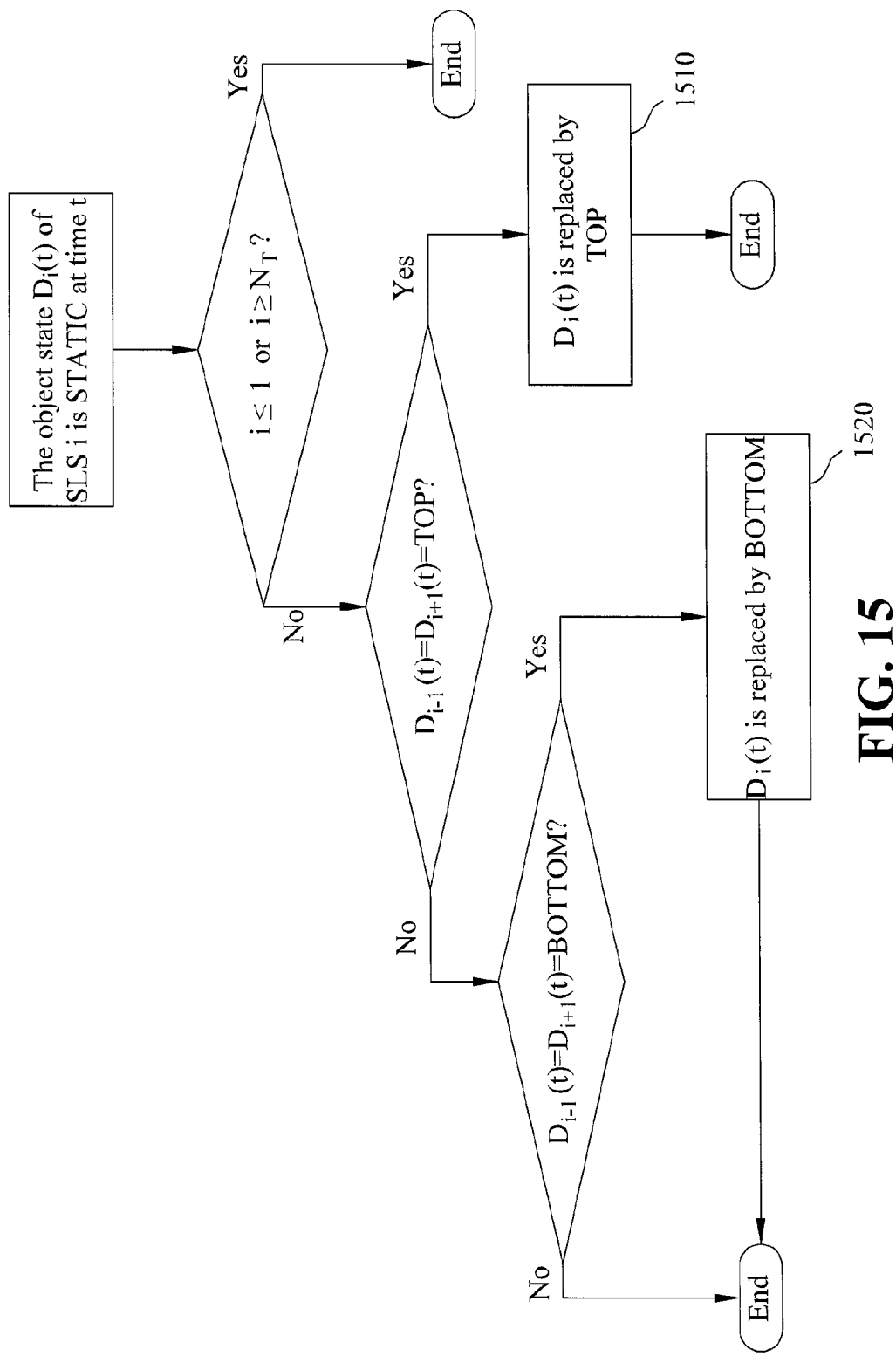
FIG. 15 shows a flow chart of a repair procedure for a SLS having a STATIC state, according to an exemplary embodiment.

In an actual scene, such as when a motion detection is performed, a hole may formed by the variation pixels in the internal portion of the object due to sampling distortion, noise effect, or object color and background being similar, etc., thereby resulting in the object states of sampling line segments within the object being determined as STATIC. Therefore, performing a repair procedure is required for the SLS with a STATIC state. For example, it may utilize morphological operations commonly used in the image processing, to replace a STATIC state of an isolated SLS to be a directional TOP or BOTTOM state. FIG. 15 shows a flow chart illustrating a repair procedure for a SLS having a STATIC state, according to an exemplary embodiment.

Referring to FIG. 15, when the object state $D_i(t)$ of SLS i is STATIC at time t and $1<i<N_T$, if $D_{i-1}(t)=D_{i+1}(t)$=TOP, then $D_i(t)$ is replaced by TOP (step 1510); if $D_{i-1}(t)=D_{i+1}(t)$=BOTTOM, then $D_i(t)$ is replaced by BOTTOM (step 1520). In other words, when the object state Di (t) of SLS i at time t is STATIC, if the object states of the two SLS closest to SLS i are both TOP or both BOTTOM, the object state of SLS i may be modified as the object state of these two nearest sampling line segments. After having performed a repair procedure according to the flow chart of FIG. 15 for the SLS having a STATIC state in FIG. 14, $D_{17}(t)$ is modified as BOTTOM as indicated by an arrow in FIG. 16.

From the final obtained object state of each SLS $D_i(t)$, it may be seen that both sides of a virtual gate line in the frame contain moving objects. It may further calculate the number of objects across the virtual gate line by observing the state variation values of SLS at each time point. As described below, firstly $C_i(t)$ is defined as the state variation value of the i-th SLS, and this state variation value including threes categories of from top to bottom (DOWN), from bottom to top (UP), and no action (NONE), i.e. $C_i(t)$ is calculated as follows:

$$C_i(t) = \begin{cases} \text{DOWN} & \text{if } D_i(t-1) = \text{TOP and } D_i(t) = \text{BOTTOM}, \\ \text{UP} & \text{if } D_i(t-1) = \text{BOTTOM and } D_i(t) = \text{TOP}, \\ \text{NONE} & \text{otherwise.} \end{cases}$$

After state variation value $C_i(t)$ of each SLS i is calculated at time t, it may gather statistics of several segments having a same state variation value and the lengths of these segments from $C_i(t)$. Let l(t) is the length of a segment with a same state variation value (DOWN or UP), i.e., the number of consecutive sampling line segments with a same state variation value. Define the number of sampling line segments in a single object to be $N_O$, then N(t), the number of objects across the virtual gate line at time t, may be obtained by the following formula:

$$N(t) = \left\lfloor \frac{l(t)}{N_0} + 0.5 \right\rfloor.$$

Figure 17:
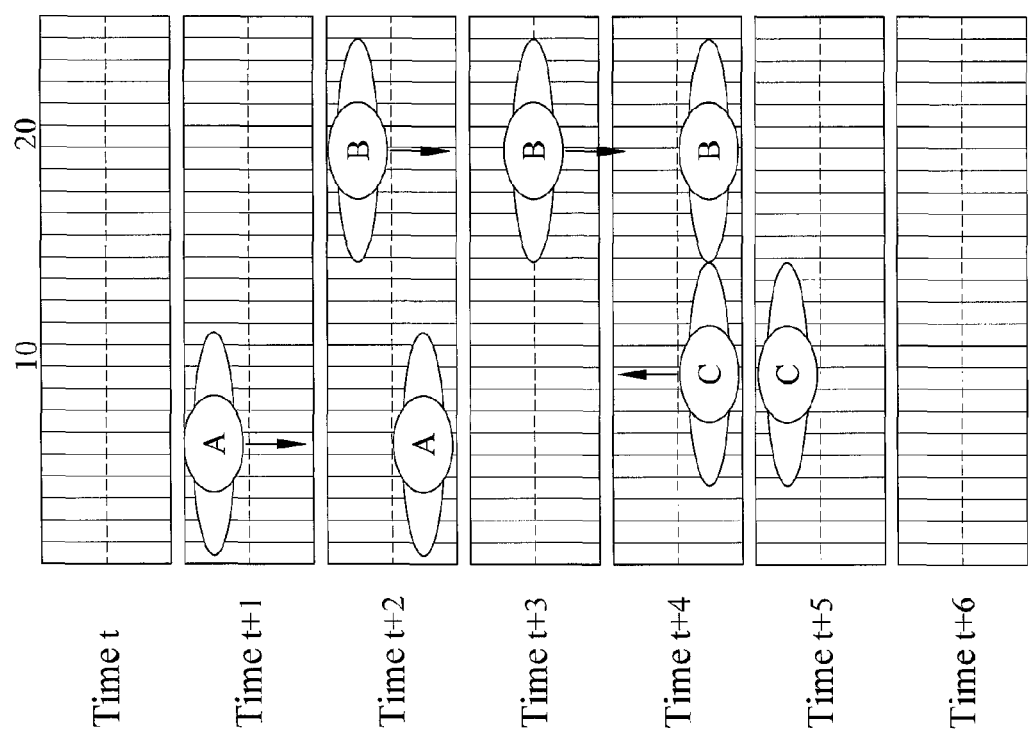
FIG. 17 shows an exemplary sequence of sampling images containing moving objects at time t, t+1, t+2, t+3, t+4, t+5, and t+6, according to an exemplary embodiment.
Figures 18, 19:
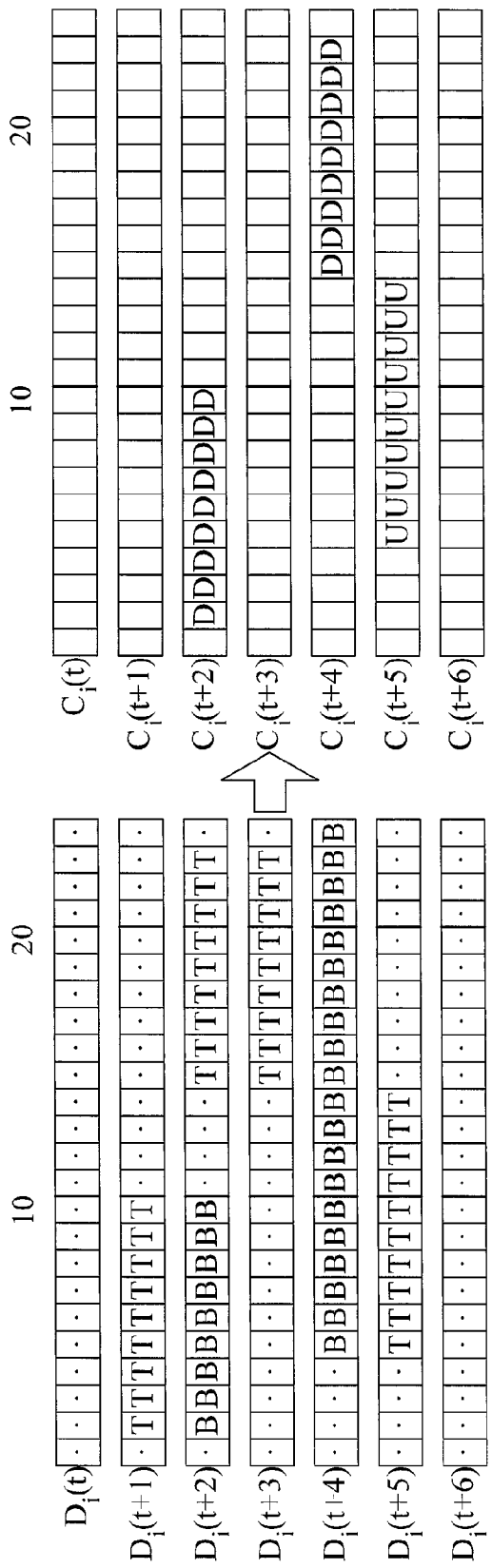
FIG. 18 shows an exemplary result of the object state of each SLS, after having performed motion detection, SLS variation calculation, and SLS state determination on the sequence of sampling images of FIG. 17, according to an exemplary embodiment.
FIG. 19 shows an exemplary result of the state variation value of each SLS, by taking FIG. 18 as an exemplar, according to an exemplary embodiment.

Therefore, the number of objects at time t from top to bottom (DOWN) and from bottom to top (UP) may be calculated. The actions of from top to bottom (DOWN) and from bottom to top may be interpreted as entering an area and leaving an area, and this may depend on the actual application environment, FIG. 17 shows an exemplary sequence of sampling images containing moving objects at time t, t+1, t+2, t+3, t+4, t+5, and t+6, according to an exemplary embodiment. Wherein, there are a person A who is going down, a person B who is going down, and a person C who is going up, according to the order of crossing a virtual gate line (represented by a dotted line). After having performed motion detection 324, SLS variation calculation 326, and SLS state determination 328 on sequence of sampling images, it may obtained the object state $D_i(t)$ of each SLS i, as shown in FIG. 18. The state variation value $C_i(t)$ of each SLS i may further be calculated by the above mentioned equation, as shown in FIG. 19.

In the exemplar of FIG. 19, there is a corresponding segment having the same state variation value at each time point of time t+2, time t+4, and time t+5. Accordingly, at each of the three time points, the number of sampling line segments with its corresponding segment having the same state variation value may be calculated. The three calculated numbers of sampling line segments are l(t+2)=9, l(t+4)=9, and l(t+5)=10, respectively. Let the number of sampling line segments in a single object $N_O$ equals to 10, then at time t+2, time t+4, and time t+5, the three calculated numbers of objects are N(t+2)=1, N(t+4)=1, and N(t+5)=1, respectively. And, from the state variation value of each SLS, it can be obtained that the number of objects from top to bottom (DOWN) is 2 (i.e. N(t+2)+N(t+4)) and the number of objects from bottom to top (UP) is 1 (i.e., N(t+5)).

According to the above exemplary embodiments, the disclosure may be adapted to a video apparatus such as a camera to record multi-film contents including indoor and outdoor, weather, and different lighting conditions and other variable factors, etc. The objects in the video frames of an exemplary experiment are persons moving up and down with a similar distance from the ground, and the exemplary experiment takes the horizontal line of the frame center as the virtual gate line. Let the common parameters in each video frame are the number of sampling line segments in a single object $N_O$ (equals to 10), the height of a sampling image $N_P$ (equals to 10), the width of a reference object $l_W$ (equals to 120), and the depth of the reference object $l_D$ (equals to 50). And, according to the exemplary embodiments, the object counting is performed in a computing platform such as a computer system. The object counting accuracy is defined as follows:

$$\text{Accuracy} = 100\% - \left( \frac{|R_{up} - S_{up}| + |R_{DOWN} - S_{DOWN}|}{R_{up} + R_{DOWN}} \right)$$

where $R_{UP}$ and $R_{DOWN}$ are the actual number of staff in and out, respectively, and $S_{UP}$ and $S_{DOWN}$ are the experimental results after performing object counting according to the exemplary embodiments.

By comparing the experiment result of the disclosed exemplary embodiments with known technologies of the area estimation method and the optical flow method, it is found that the disclosed object counting technique significantly increases the accuracy of the object counting about 112%. The object counting technique according to the exemplary embodiments may significantly reduce computing time due to significantly reducing computation of operations.

Accordingly, the disclosed exemplary embodiments of the object counting technique perform statistical analysis of sampling data only for the area near the counting line, and define a plurality of sampling line segments parallel to the moving direction of the object, and achieve the object counting through statistical analysis of the variation state of each SLS. The disclosed technique according to the exemplary embodiments does not require any time-consuming procedure of object labeling and tracking, effectively overcomes the difficult issues of object detection and object tracking, operates normally in the cases of multi-parallel objects or opposed crossing the line, and is suitable for embedded systems with low computations. Experimental results show that the accuracy rate of the object counting may reach about 94.95%.

Therefore, the disclosed embodiments provide a video analysis based object counting technology, and at least include the following features: without requiring any specific object template, suitable for a variety of objects counting applications, such as people counting, traffic applications, people and traffic control or measuring public facilities utilization, etc.; without precisely detecting independent objects in the frame, and avoiding misjudgment of object tracking, thereby improving accuracy of the object counting; without complicated procedures involved with object labeling and tracking, thereby dramatically reducing the computations and easily to be implemented by embedded systems.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for video analytics based object counting, said method comprising:
   obtaining one or more video frames from at least one video source, and setting at least one parameter, calculating a reference point, and calculating a sampling look up table (LUT) by referring to said one or more video frames;
   on each of said one or more video frames, retrieving a sampling image to obtain information of one or more variation pixels in said sampling image according to said at least one parameter, said reference point, and said sampling LUT, and calculating the statistics of variation counts on a plurality of sampling line segments to determine at least one object state on said plurality of sampling line segments; and
   performing object counting of at least one moving object to obtain an object count, according to information of said at least one parameter and said at least one object state on said plurality of sampling line segments.

2. The object counting method as claimed in claim 1, wherein said video source comes from any one combination of one or more video devices, one or more audio and video files, and one or more network streams.

3. The object counting method as claimed in claim 1, wherein said at least one parameter includes at least one virtual gate line, at least one reference object information, and one or more path reference lines.

4. The object counting method as claimed in claim 3, said method further includes:
   defining said plurality of sampling line segments parallel to an object moving direction on said virtual gate line, each of said plurality of sampling line segments is constructed by a number of sampling points, said sampling LUT is constructed by a set of all sampling points of said plurality of sampling line segments.

5. The object counting method as claimed in claim 3, wherein said calculating the statistics of variation counts on a plurality of sampling line segments further includes:
   for each of said plurality of sampling line segments, calculating a total number of variation pixels, and a difference value for the variation pixels in a top area and in a bottom area of the virtual gate line.

6. The object counting method as claimed in claim 5, wherein said method utilizes an accumulated threshold of variation pixels $T_{motion}$ and a differential threshold $T_{diff}$ to determine at least one object state of each of said plurality of sampling line segments at a time point, and each object state is one of a static state, a state of object on top of the virtual gate line (TOP), a state of object on bottom of the virtual gate line (BOTTOM), and a uncertain state.

7. The object counting method as claimed in claim 1, wherein said information of said reference object further includes width information and depth information of the reference object.

8. The object counting method as claimed in claim 6, said method further performs a repair process for said plurality of sampling line segments with the uncertain state, wherein when an object state at a time t on one of said plurality of sampling line segments is uncertain, said method takes the sampling line segment (SLS) as a center, and searches the sampling line segments having an object state of TOP or BOTTOM from near to far, once such a SLS is found, the object state of the SLS is replaced by the object state of the found SLS, and for each of the sampling line segments having an uncertain state and without being completely performed the repair process at the time t, the object state of the SLS is replaced by referring to its object state at a previous time t−1.

9. The object counting method as claimed in claim 8, said method further performs another repair process for said plurality of sampling line segments with the static state, wherein when an object state at a time t on one of said plurality of sampling line segments is the static state, and if the object states of the two of said plurality of sampling line segments closest to the SLS are both TOP or both BOTTOM, the object state of the SLS is replaced by the object state of these two nearest sampling line segments.

10. The object counting method as claimed in claim 9, wherein the performing object counting of at least one moving object further includes:
at each of a plurality of time points, calculating a state variation value on each of said plurality of sampling line segments to gather statistics of the number of consecutive sampling line segments having a same state variation value for one or more segments, according to the repaired object states of said plurality of sampling line segments; and
calculating a total number of objects across said virtual gate line of each of the one or more segments to obtain the object count, according to the width information of the reference object and the total number of consecutive sampling line segments having the same state variation value for the one or more segments.

11. The object counting method as claimed in claim 6, wherein the determining an object state of each sampling line segment (SLS) of said plurality of sampling line segments at a time point further includes:
when a total number of variation pixels on the SLS at the time point being less than $T_{motion}$, the object state of the SLS being determined as the static state;
when the total number of variation pixels on the SLS at the time point being greater than or equal to $T_{motion}$ and a difference value for the variation pixels in a top area and in a bottom area of the virtual gate line being greater than or equal to $T_{diff}$, the object state of the SLS being determined as TOP;
when the total number of variation pixels on the SLS at the time point being greater than or equal to $T_{motion}$ and the difference value for the variation pixels in a top area and in a bottom area of the virtual gate line being less than or equal to $-T_{diff}$, the object state of the SLS being determined as BOTTOM; and
when the total number of variation pixels on the SLS at the time point being greater than or equal to $T_{motion}$ and the difference value for the variation pixels in a top area and in a bottom area of the virtual gate line being greater than $-T_{diff}$ and less than $T_{diff}$, the object state of the SLS being determined as the uncertain state.

12. An apparatus for video analytics based object counting, said apparatus comprising:
an object counting module to perform under control of one or more computer systems:
obtaining one or more video frames from at least one video source, and setting at least one parameter, calculating a reference point, and calculating a sampling look up table (LUT) by referring to said one or more video frames;
on each of said one or more video frames, retrieving a sampling image to obtain information of one or more variation pixels in said sampling image according to said at least one parameter, said reference point, and said sampling LUT, and calculating the statistics of variation counts on a plurality of sampling line segments to determine at least one object state on said plurality of sampling line segments; and
performing object counting of at least one moving object to obtain an object count, according to information of said at least one parameter and said at least one object state on said plurality of sampling line segments; and
a computer readable medium for storing results of said calculating.

13. The object counting apparatus as claimed in claim 12, wherein said object counting module is an executable program instruction set in said one or more computer systems, and executes in one or more physical central processing units of said one or more computer systems.

14. The object counting apparatus as claimed in claim 12, wherein said at least one parameter at least includes a virtual gate line, information of a reference object, and one or more path reference lines.

15. The object counting apparatus as claimed in claim 12, wherein said plurality of sampling line segments parallel to an object moving direction on said virtual gate line.

16. The object counting apparatus as claimed in claim 12, wherein each of said plurality of sampling line segments is constructed by a number of sampling points, and said sampling LUT is constructed by a sampling point set of the plurality of sampling line segments.

17. The object counting apparatus as claimed in claim 12, wherein calculation results of said object counting module are stored into said computer readable medium or outputted to an external device.

18. The object counting apparatus as claimed in claim 12, said apparatus accesses video source to obtain said one or more video frames from one combination of one or more video devices, one or more audio and video files, and one or more network streams.

* * * * *